United States Patent [19]
Ramacciotti

[11] 3,833,355
[45] Sept. 3, 1974

[54] PROCESS FOR THE REDUCTION, IN LIQUID PHASE, OF IRON ORE IN A ROTARY KILN

[75] Inventor: Aldo Ramacciotti, Rome, Italy

[73] Assignee: Centro Sperimentale Metallurgico S.P.A., Rome, Italy

[22] Filed: Jan. 18, 1972

[21] Appl. No.: 218,829

[30] Foreign Application Priority Data
Feb. 3, 1971   Italy .................................. 48149/71

[52] U.S. Cl. ................................................... 75/40
[51] Int. Cl. ............................................ C21b 11/06
[58] Field of Search ......................... 75/40, 93 R, 61

[56] References Cited
UNITED STATES PATENTS

| | | | |
|---|---|---|---|
| 920,391 | 5/1909 | Reid .................................... | 75/40 X |
| 2,395,286 | 2/1946 | Merle ........................... | 75/93 R UX |
| 2,566,548 | 9/1951 | Beauchesne et al. ............... | 75/40 X |
| 2,862,811 | 12/1958 | Eketorp et al. ..................... | 75/61 X |
| 2,866,703 | 12/1958 | Goss .................................. | 75/93 T |
| 3,169,055 | 2/1965 | Josefsson et al. ....................... | 75/40 |
| 3,251,681 | 5/1966 | Wakamatsu et al. .................. | 75/61 |
| 3,511,644 | 5/1970 | Josefsson et al. ....................... | 75/40 |
| 3,653,879 | 4/1972 | Wienert ............................. | 75/93 R |
| 3,689,251 | 9/1972 | Goss ................................. | 75/40 X |
| 2,611,693 | 9/1952 | Geyer ............................... | 75/58 |

FOREIGN PATENTS OR APPLICATIONS

| | | | |
|---|---|---|---|
| 978,445 | 12/1964 | Great Britain ......................... | 75/40 |
| 17,772 | 10/1907 | Norway ................................. | 75/40 |

*Primary Examiner*—L. Dewayne Rutledge
*Assistant Examiner*—M. J. Andrews
*Attorney, Agent, or Firm*—Young and Thompson

[57] ABSTRACT

Process for the production of liquid carburized iron by direct reduction in liquid phase, of iron-containing materials in an essentially cylindrical vertical reactor, rotating around its geometrical axis, wherein the material containing iron in oxidized state mixed with flux and the reducing material is fed while the reactor is in motion, in alternate layers, which owing to the centrifugal force or to their own friction, adhere to the internal wall of the reactor, the layer next to the reactor wall consisting of the reducing material and the adjacent layer, situated nearer the geometrical axis of the reactor consisting essentially of material containing iron in oxidized state mixed with a fluxing agent and wherein the carbon monoxide developed in the reduction reactions occurring between the hereinbefore said layers is entirely burnt to carbon dioxide by means of a jet of pure oxygen injected into the reactor.

7 Claims, No Drawings

PROCESS FOR THE REDUCTION, IN LIQUID PHASE, OF IRON ORE IN A ROTARY KILN

The present invention covers a process for the reduction, in liquid phase, of material containing iron in an oxidized state, in a rotary vessel. More precisely the invention concerns a continuous and controlled process for the production of liquid carburized iron, by means of a direct reduction of material containing iron in an oxidized state, for example iron ore.

In the present state of the art, the blast furnace is important for the production of liquid carburized iron. However its operation, being dependent on availability of auxiliary equipment, such as for example that necessary for coke production, for the pre-treatment of the ore in order to give it the proper grain size, for the pre-heating of the air to be blown and for dust removal from the exhaust gases, the operating costs are very high.

This has motivated research into improved and less expensive processes. Moreover the large dimensions of the blast furnaces and the physical chemical conditions which occur in them make practically impossible either an integral exploitation of the heating power of the coke or rapid acceleration of the characteristic reactions of the process.

Another process for the production of carburized iron able to obviate the hereinbefore said drawbacks is based on a continuous loading of iron ore of fine grain size, mixed with the reducing agent, into the mouth of a vertical reactor of an essentially cylindrical shape, rotating at a high speed around its geometrical axis and supplied with a hole in its bottom. A jet of pure oxygen is continuously blown, by means of a lance, onto the surface of the mix and from the aforesaid hole the carburized iron produced is continuously discharged.

The speed of the process is very high because of the increase of the contact surface between the single phases, the increase being, as is known, a direct consequence of the rotation of the reactor.

One of the main drawbacks connected with this process consists in the contemporaneous and direct exposure of the fuel, for example coke with a fine grain size, to the oxygen jet and to the material to be reduced. Thus in this way the characteristic functions of the coke, that is the reducing and the combustive functions are no longer performed in a separated and controlled way; under these conditions, in fact, a portion of the coke reacts directly with oxygen, producing the heat necessary for the process, and the remainder is used in the direct reduction of the ore, but all in an uncontrollable manner.

The object of the present invention is to provide an improved process as compared to that hereinbefore described, which is not only able to improve the control of the operations and reproducability of the results, but also to allow a considerable saving in fuel.

The said advantages of the present invention do not compromise the attainment of a satisfactory heat distribution and the realization of physical-chemical conditions inhibiting the passage of elements, possibly present in the original mineral, such as for example silicon, manganese and phosphorous, into the reduced iron matrix. The above defined aims are insured in the process covered by the present invention, by means of a particular arrangement of the components of the charge. In fact the reducing agent (for example coke) and the ore are not introduced into the reactor in form of a mixture, but in alternate layers, the layer nearest the reactor walls consisting of coke and the next of ore, proceeding towards the geometric axis of the reactor.

The said arrangement of the charge causes the coke to react directly and exclusively with the oxygen of the ore according to a reaction of the following type:

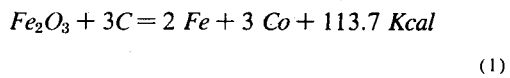

$$Fe_2O_3 + 3C = 2\ Fe + 3\ Co + 113.7\ Kcal \qquad (1)$$

The resulting carbon monoxide, once diffused through the ore layer, is entirely oxidized to carbon dioxide with a jet of pure oxygen fed at variable flow rate, and injected with a lance which can adopt a variable and controllable vertical position, according to the reaction:

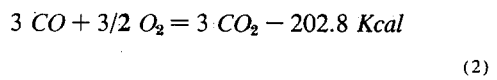

$$3\ CO + 3/2\ O_2 = 3\ CO_2 - 202.8\ Kcal \qquad (2)$$

The saving in coke is a direct consequence of the circumstance, made possible by the particular stratification of the charge components according to the present invention, that the same carbon of the coke, which was necessary to reduce the ore, burns as carbon monoxide, to carbon dioxide thus supplying the process with the heat necessary to its development.

It must be observed however, that the amount of heat supplied by reaction (2) has not turned out to be sufficient for the heating and the melting ($\sim$ 1,600°C) of the ore, for the heating of the coke and of other possible materials (for example fluxes) introduced into the reactor and finally, for the development of endothermic reaction (1). This insufficiency has been obviated in the process covered by the present invention, by mixing with the ore a supplementary amount of coke (or other fuel) able to supply, by direct combustion with oxygen blown in gaseous form the amount of heat needed to make up the thermal deficiency of the process, squaring its balance.

Thermal balance may also be restored by the combustion of a supplementary solid, liquid or gaseous fuel.

As soon as the first ore layer is used up in the reduction reaction with coke, a suitable feeding-distributing device rebuilds the adjacent layer of coke consumed in the reaction and lays over it a new layer of ore.

Maintaining suitable oxidation conditions in the lower part of the reactor makes it possible also to govern the degree of carburation of the final product before its discharge from the reactor.

Besides, it has been ascertained that in order to avoid dust formation during the distribution of the materials and in order to obtain at the same time, particles with the smallest possible dimensions, the most suitable grain size for the ores of the charge should range from 0.2 to 3 mm.

As for the stratification, it has been observed that good results are obtained when the coke layer consumed for the ore reduction, called the working layer, as well as the mineral layer (or the layer of mineral mixed with an auxiliary fuel) are both from 1 to 10 mm thick.

It must be furthermore added that between the lining of the lateral walls and the working coke layer, a basis layer still consisting of coke may or may not be present.

The thickness of the latter layer ranges from 5 to 10 cm.

The rotation speed of the reactor is maintained at such levels as to allow on the one hand the adhesion to the walls by centrifugal force and friction of the solid material and on the other hand not to prevent the liquid carburized iron from flowing towards the bottom in the space comprised between the reducing layer and the layer containing iron in an oxidized state.

The aims and the advantages of the process of the present invention will be further clarified by reference to the following example.

Example

A cylindrical steel vessel, internally lined with refractory material is used as a reactor with the following internal dimensions $D = 400$ mm; $H = 900$ mm.

The process characteristics are indicated in the following table

TABLE

| | | |
|---|---|---|
| Rotating speed of the vessel | 115 | rpm |
| Oxygen flow rate | 60 | $Nm^3/h$ |
| Feeding rate for the coke | 0.8 | Kg/min |
| Feeding rate for the mixture with 0.13 kg of auxiliary coke per kg of ore | 2 | kg/min |
| Feeding rate for the lime | 0.750 | kg/min |

Iron carburized at around 2 percent is obtained under these conditions at the production rate of 1.4 kg/min.

The present invention resides entirely in the above process and not in the equipment with which the process is practiced. Suitable equipment comprising a vessel rotatable about a vertical axis, with means to feed ore and coke thereto and an oxygen lance, is well known in the art, for example as in U.S. Pat. Nos. 2,611,693, 3,251,681 and 3,653,879, and in German Offenlegungschriften Nos. 1,066,751 and 1,458,910 and French Pat. No. 2,039,257, to which reference is had for a more particular disclosure of such equipment.

The present invention has been described with particular reference to a preferred embodiment thereof, but it is intended that the invention not be limited by the embodiment described but rather that it be accorded an interpretation consistent with the scope and spirit of the appended claims.

Having thus described the present invention, what is claimed is:

1. In a process for the production of liquid carburized iron by direct reduction in liquid phase of iron-containing materials in a substantially cylindrical vertical reactor, comprising introducing material containing iron in oxidized state and a carbonaceous reducing material into said reactor while rotating said reactor about a vertical axis at a speed sufficient to maintain said materials against the reactor wall by centrifugal force, and removing molten iron from the lower end of the reactor; the improvement comprising feeding the material containing iron in an oxidized state after feeding the carbonaceous reducing material into the reactor to obtain alternate layers with the layer next to the reactor wall being substantially all of a carbonaceous reducing material and the next adjacent layer disposed nearer said axis and consisting essentially of material containing iron in an oxidized state, and introducing oxygen-containing gas into the reactor to burn to carbon dioxide the carbon monoxide product of reduction of said material containing iron in oxidized state.

2. A process is claimed in claim 1, in which said reducing material is coke and said alternate layers are of a thickness of 1 to 10 millimeters.

3. A process as claimed in claim 1, and depositing a layer of coke 5 to 10 centimeters thick between said reactor wall and said alternate layers.

4. Process according to claim 1, wherein the heat necessary to compensate the deficit of the thermal balance of the process is supplied by the combustion of a supplementary fuel.

5. Process according to claim 1, wherein the rotation speed of the reactor is maintained at such levels as to allow on the one hand, the adhesion to the walls by centrifugal force and friction of the solid material and on the other hand not to prevent the liquid carburized iron from flowing towards the bottom in the space comprised between the reducing layer and the layer containing iron in an oxidized state.

6. Process according to claim 1, wherein the grain size of the solid components of the charge ranges from 0.2 to 3 mm.

7. Process according to claim 6, wherein the heat necessary to compensate the deficit of the thermal balance of the process is supplied by the combustion of a part of the reducing material which remains uncovered by the material in the oxidized state.

* * * * *